Dec. 18, 1962 H. R. KAISER 3,069,662

LOW POWER MAGNETIC CORE SHIFT REGISTER

Filed March 17, 1958

INVENTOR.
HAROLD R. KAISER
BY
George C. Sullivan
Agent

United States Patent Office 3,069,662
Patented Dec. 18, 1962

3,069,662

LOW POWER MAGNETIC CORE SHIFT REGISTER

Harold R. Kaiser, Los Altos, Calif., assignor to Lockheed Aircraft Corporation, Burbank, Calif.

Filed Mar. 17, 1958, Ser. No. 721,884
2 Claims. (Cl. 340—174)

Figure 1:
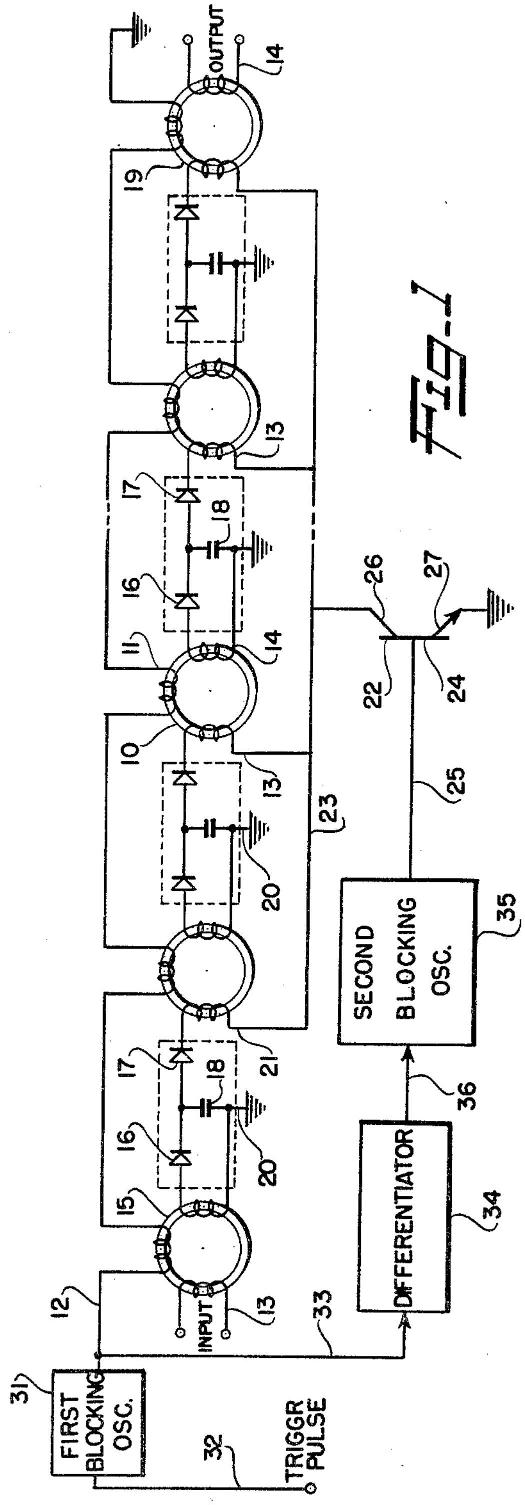

This invention relates to registers such as are employed in digital computing apparatus and more particularly to a low power magnetic core shift register.

Shift registers normally employ magnetic cores having rectangular hysteresis loops for storing binary information in the form of the direction of remnant magnetization. It is conventional for these registers to incorporate some form of delay line between the input and output windings of each succeeding stage which absorbs power and thereby increases the power requirements of the shift register. This is often undesirable where the available power is limited. Also in the type of shift register commonly used, the time duration of the shift current pulse must be controlled both as to maximum and minimum, complicating the driving circuitry for the shift register. Too short a pulse may not be effective to change the state of core magnetization while too long a pulse may blanket the binary information in the delay line and thereby prevent its being shifted from one core to the next.

It is an object of this invention to provide a magnetic core shift register which absorbs very little power and much less than any of the other known magnetic core shift registers.

It is another object of this invention to provide a magnetic core shift register having no maximum duration requirements for the shift current pulse. The only requirement for the shift current pulse is that it have a time duration no less than that required to change the state of core magnetization.

It is another object of this invention to provide a magnetic core shift register having a capacity storage network between stages which is discharged through the use of a switch to effect the transfer of binary information in a series of cores from one core to the next succeeding core.

Further and other objects will become apparent from a reading of the detail description especially when considered in combination with the accompanying drawing wherein like numerals refer to like parts.

Figure 2:
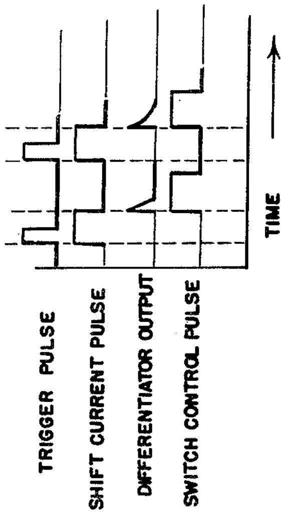

In the drawing:

FIGURE 1 is a schematic circuit diagram showing the magnetic core shift register of this invention, and FIGURE 2 shows the shift current and switch control pulse sequencing for the magnetic core shift register.

Referring to FIGURE 1 the magnetic core shift register includes a plurality of magnetic cores 10 having generally rectangular hysteresis loops for storing digital information in the form of the direction of remnant magnetization. A shift current winding 11 is provided on each core and connected in series with the shift current windings on the other cores through line 12 for applying current pulses to set up a magnetizing force of such magnitude and polarity that all cores are thereby returned to a common state of magnetization. Each core is also provided with an input winding 13 and an output winding 14 for transferring the digital information from one core to another.

Input winding 13 on the first or input core 15 is adapted to receive and feed into the register the pulses representing the binary information. Each of the other input windings are coupled to the output winding on the preceeding core through an energy storage network consisting of a pair of diodes 16 and 17 arranged in series and a storage capacitor 18 arranged in parallel with respect to the associated output winding 14, one side of which is grounded at 20. The diodes provide for the unidirectional flow of information from one core to the next succeeding core while capacitor 18 stores the information for application to the succeeding coil in accordance with a predetermined timing sequence controlled by a switching device as hereinafter described. The output winding 14 on the last or output core 19 in the shift register is employed for extracting the digital information from the shift register as the information is received from the preceding stages represented by the several cores, coils and energy storage networks.

One end 21 of each input winding 13 with the exception of the input winding on the first or input core 15 are coupled in parallel with each other and in series with a transistor 22 through line 23. Transistor 22 serves as the switching device previously mentioned for effecting the transfer of information from the storage capacitor in one stage to the core of the next succeeding stage.

The digital information is fed into the shift register in the form of pulses which are applied to input coil 13 at the first or input core 15. On the application of a shift current pulse on line 12, all cores revert to a common state of magnetization which may be referred to as the "0" state. Thus, assuming input core 15 was not in the "0" state of magnetization but was in the opposite state which may be referred to herein as the "1" state prior to the shift current pulse, its state of magnetization is changed to the "0" state. This change in the state of magnetization induces a voltage in output winding 14 of input core 15 producing a current in the associated energy storage network which charges its capacitor 18. With transistor 22 nonconductive, no current will flow through the input winding on the next succeeding stage to affect the state of magnetization of its associated core. The capacitor cannot discharge through diode 17 until transistor 22 is made conductive. Thus, after the termination of the shift current pulse on line 12 a switch control pulse of voltage may be applied to base 24 of the transistor through lead 25 to overcome the bias on the transistor and cause it to saturate. The transistor when saturated, provides a very low resistance path from collector 26 to emitter 27. Therefore, with the emitter grounded, capacitor 18 will discharge through associated diode 17 and input winding 13 on the next succeeding stage. This discharge current sets the next succeeding core to the same state as the input core prior to the application of the shift current pulse. The digital information stored in the cores is shifted to the core in the next succeeding stage by the application of another shift current pulse and another switch control pulse in the same manner as described above. The process may be repeated until each bit of digital information fed into the register is picked up by output winding 14 on output core 19 representing the last stage of the register. Obviously as many stages as is needed may be employed in the register to store the desired quantity of information.

The switch control and shift current pulses for the register may be generated in many different ways, one way being illustrated by way of example in FIGURE 1. A first blocking oscillator 31 is employed to provide the shift current pulses on line 12. This first blocking oscillator generates an output pulse having an amplitude and pulse width capable of changing the state of core magnetization. This output pulse which is termed herein the "shift current pulse" is produced in response to applying a trigger pulse on line 32. Oscillator 31 is of the "one-shot" type, producing a shift current pulse at the output in response to the application of a trigger pulse at the input. The output of oscillator 31 in addition to feeding shift current windings 11 are applied through line 33 to a differentiator 34. The output of the differentiator is a trigger pulse produced by the trailing edge of the shift current pulse. This output drives a second blocking oscillator 35 through line 36. Each time the trigger pulse from differentiator 34 is applied to oscillator 35 a switch control pulse is produced overcoming the bias on transistor 22, causing it to become saturated and provide a low resistance path to ground through the collector and emitter electrodes for discharging capacitors 18.

The time duration of the switch control pulse should be no less than that needed to change the state of core magnetization. Also this pulse should allow substantially complete discharging of capacitors 18. Further, the storage networks in the register should not be allowed to discharge into the next succeeding stage until the shift current pulse has terminated. This timing of the pulses may be automatically obtained by differentiating the shift current pulse as illustrated in FIGURE 2. Differentiating the shift current pulse to obtain the switch control pulse is considered to be a good approach to the driving circuitry for the shift register however it should be understood that the shift current and switch control pulses may be produced in any desired manner without departing from the teachings of the invention.

It is not intended that the scope of the invention be limited to the specific embodiment shown. Rather, it should be understood that certain alterations, modifications and substitutions may be made to the instant disclosure without departing from the teachings of the invention as defined by the appended claims.

I claim:

1. A low power magnetic core shift register comprising, a plurality of magnetic cores having generally rectangular hysteresis loops for storing digital information in the form of the direction of remnant magnetization, energy storage means coupling said cores to form a plurality of series arranged stages, said energy storage means including a pair of unidirectional current flow means connected in series from one stage to the next succeeding stage, and a capacitor connected in parallel between the pair of unidirectional current flow means for the storage of the information energy, coil means inductively coupled to the series of stages for feeding information energy to and from the shift register, shift current coil means connecting in series with the core in each stage and returning all said cores to a common state of magnetization and effecting the transfer of information energy from a core to the associated storage network in each stage in response to the application of a shift current pulse, a normally open switch common to all stages and coupled in parallel to each stage and selectively effecting the transfer of information from the energy storage means to the core in the next succeeding stage only in response to the application of a switch control pulse closing the switch, and means generating said shift current pulse and said switch control pulse respectively in non-overlapping timed sequence.

2. A device as set forth in claim 1 wherein the means generating said shift current pulse and said switch control pulse in timed sequence comprises a first blocking oscillator responsive to the application of an externally generated triggering pulse for producing each shift current pulse, means differentiating the shift current pulse to provide an internally generated trigger pulse at the termination of the shift current pulse, and a second blocking oscillator responsive to said internally generated trigger pulse and producing a switch control pulse for actuating the switch means.

References Cited in the file of this patent

UNITED STATES PATENTS

| | | |
|---|---|---|
| 2,708,722 | An Wang | May 17, 1955 |
| 2,785,390 | Rajchman | Mar. 12, 1957 |
| 2,825,890 | Ridler | Mar. 4, 1958 |
| 2,866,178 | Lo et al. | Dec. 23, 1958 |
| 2,888,667 | Schmitt | May 26, 1959 |
| 2,898,579 | Moore | Aug. 4, 1959 |
| 2,957,165 | Newhouse | Oct. 18, 1960 |
| 3,024,446 | Kornfield | Mar. 6, 1962 |